United States Patent [19]

Iizuka

[11] 4,158,861
[45] Jun. 19, 1979

[54] FACSIMILE COMMUNICATION SYSTEM AND METHOD

[75] Inventor: Yoshio Iizuka, Sagamihara, Japan

[73] Assignees: Fujitsu Limited; Matsushita Graphic Communication Systems, Inc., both of Japan

[21] Appl. No.: 763,516

[22] Filed: Jan. 28, 1977

[30] Foreign Application Priority Data

Feb. 5, 1976 [JP] Japan .................................. 51-12053

[51] Int. Cl.² .......................... H04N 1/40; H04N 7/12
[52] U.S. Cl. .................................... 358/260; 358/257; 358/261
[58] Field of Search ................ 358/260, 261, 288, 257

[56] References Cited

U.S. PATENT DOCUMENTS

| | | | |
|---|---|---|---|
| 3,643,016 | 2/1972 | Dattilo | 358/288 |
| 3,804,975 | 4/1974 | Abe | 358/260 |
| 3,830,966 | 8/1974 | Aldrich | 358/261 |
| 3,919,464 | 11/1975 | Kondoh | 358/260 |
| 3,947,627 | 3/1976 | Tanaka | 358/261 |
| 3,955,045 | 5/1976 | Ford | 358/288 |
| 3,991,267 | 11/1976 | Beaudette | 358/261 |

*Primary Examiner*—Howard W. Britton
*Attorney, Agent, or Firm*—Staas & Halsey

[57] ABSTRACT

A facsimile communication system for compressing, transmitting and reproducing facsimile information is provided, wherein a transmitter includes a correlation detector. When a first facsimile information scanned along a first scanning line has a low pattern density, the correlation detector determines by discrimination that at least one successive facsimile information, for example a second facsimile information scanned along a second scanning line adjacent to the first scanning line, should be abridged. Then, the transmitter compresses the first facsimile information and a third facsimile information contained in a third scanning line, and the compressed first and third facsimile informations are transmitted to a remote receiver. The remote receiver also includes a correlation detector and the correlation detector determines by discrimination that the compression-demodulated first facsimile information has a low pattern density. Then, the remote receiver supplies the first facsimile information to a recording device when it scans a first scanning line and further, repeated first facsimile information is supplied to at least one successive scanning line, for example, to a second scanning line. Thereafter, the compression-demodulated third facsimile information is supplied to the recording device when it scans a third scanning line.

25 Claims, 15 Drawing Figures

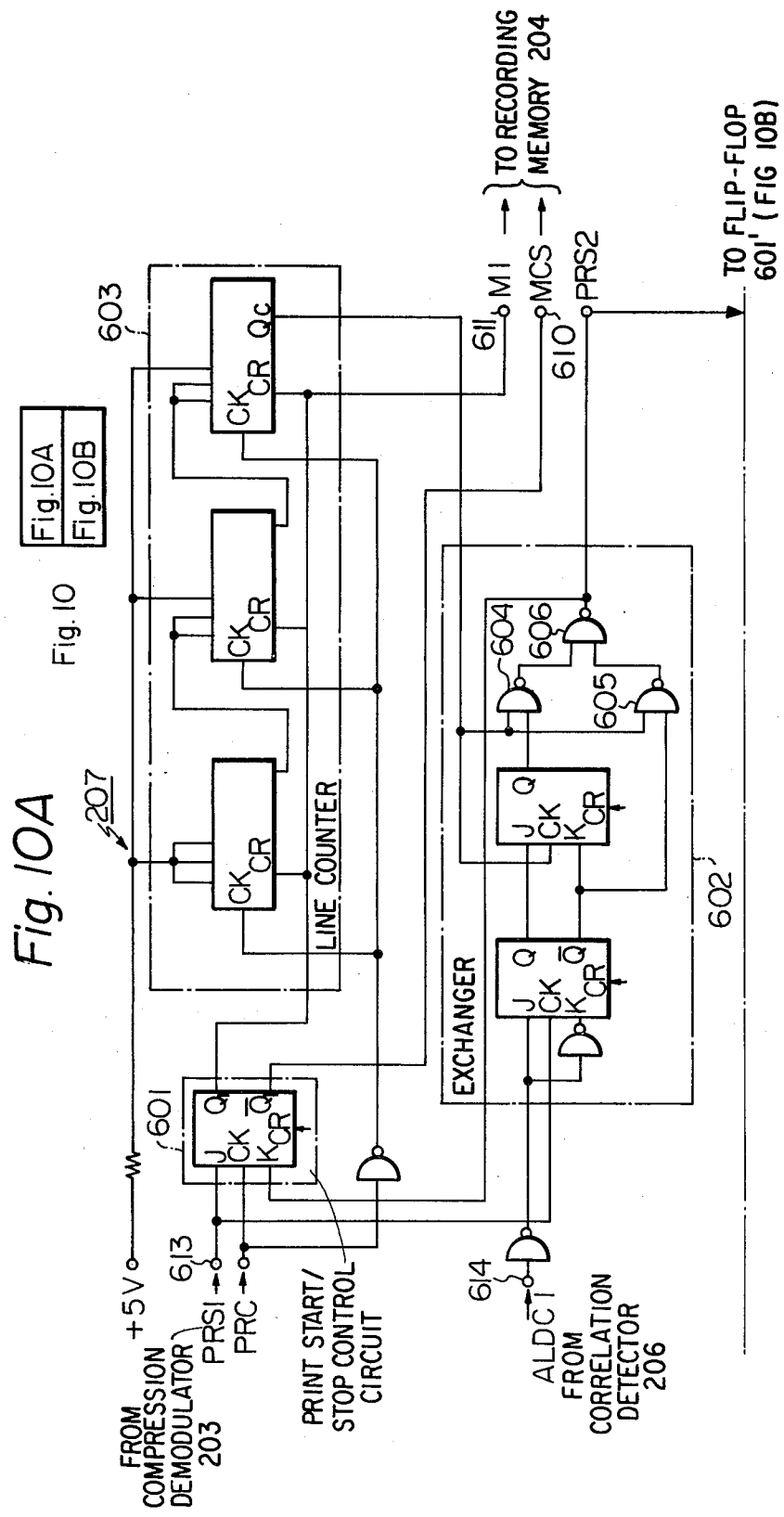

FACSIMILE COMMUNICATION SYSTEM AND METHOD

The present invention relates to a facsimile communication system and, more particularly, to a method and apparatus for compressing, transmitting and reproducing a video signal applied to a facsimile communication system.

A method for compressing the video signal of a facsimile communication system has been proposed which method is realized by utilizing the correlation of adjacent picture elements to be transmitted arranged in a main scanning direction, that is horizontal scanning direction. Another method for compressing the video signal has been proposed which method is realized by utilizing the correlation of adjacent picture elements to be transmitted arranged in a sub scanning direction, that is the vertical scanning direction with respect to the direction in which a document is fed. The latter method is more useful than the former method because of its increased transmission efficiency, that is reduction of trasmission time.

A facsimile transmission system of the prior art based on said latter method, is provided with selection buttons, and the scanning line density in the sub scanning direction is changed by operating one of the selection buttons in accordance with the pattern density of a document to be transmitted. The scanning line density in the sub scanning direction is defined by, for example, 8 lines/mm, 4 lines/mm or 2.7 lines/mm. The operator checks the pattern density of a document to be transmitted, and operates the desired one of the selection buttons. If the document has a high pattern density, the operator will select a high scanning line density, for example, 8 lines/mm, by operating the corresponding selection button. If the document has a low pattern density, the operator will select a low scanning line density, for example, 2.7 lines/mm.

The facsimile communication system of the prior art mentioned above has the following defects. Firstly, it is necessary to have an operator check the density pattern of every document and operate the appropriate selection buttons. Secondly, if a document has a mixture of high pattern density and low pattern density, it is impossible for an operator to manually operate the appropriate selection buttons.

Therefore, it is an object of the present invention to provide a method and apparatus for compressing, transmitting and reproducing a video signal, which method eliminates the above-mentioned defects. In short, the scanning line density in said sub scanning direction is automatically changed in accordance with the pattern density in each scanning line of a document to be transmitted.

It is a further object of the present invention to provide a method and apparatus for compressing, transmitting and reproducing a video signal, which method can be applied to a conventional dual-line video signal compression method without reducing the quality of the facsimile of an original document reproduced in the remote receiver.

The details of the present invention will become apparent from the ensuing description with reference to the accompanying drawings wherein:

FIGS. 10A and 10B show a detailed block diagram of a record control circuit (207) shown in FIG. 6;

Generally, facsimile information contained in one scanning line is relatively similar to facsimile information contained in a scanning line adjacent to said scanning line. Accordingly, if the density of the facsimile information is low, the facsimile information contained in one scanning line may be represented by the facsimile information contained in the scanning line adjacent to said scanning line. In recent years, a variable feed scanning method has been proposed which is realized by utilizing the above-mentioned fact. In the variable feed scanning method, the scanning line density in the sub scanning direction is automatically controlled in accordance with the density of the facsimile information contained in each scanning line. The density of facsimile information contained in each scanning line is measured by a density measuring circuit in the transmitter and the transmitter decides the appropriate scanning line density in the sub scanning direction. When a low density of the facsimile information in one scanning line is measured by said density measuring circuit, the transmitter transmits only two succesive end signals to a receiver instead of transmitting the full facsimile data signal of the facsimile information contained in the scanning line. Thus, the facsimile data signal can be abridged and compression of the band width of the video signal is achieved. In the remote receiver, when said two successive end signals are received from the transmitter, a step motor for feeding a recording medium feeds the recording medium by one step, that is one scanning line, in the sub scanning direction. As a result, one scanning line scanned in the transmitter always coincides with a corresponding scanning line scanned in the remote receiver.

Figure 1A:
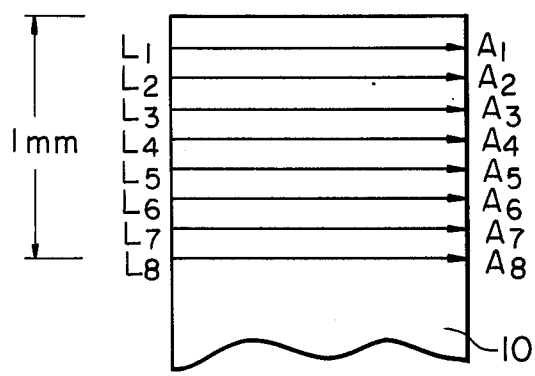
FIG. 1A is an explanatory view of a pattern of typical scanning lines.
Figure 1B:
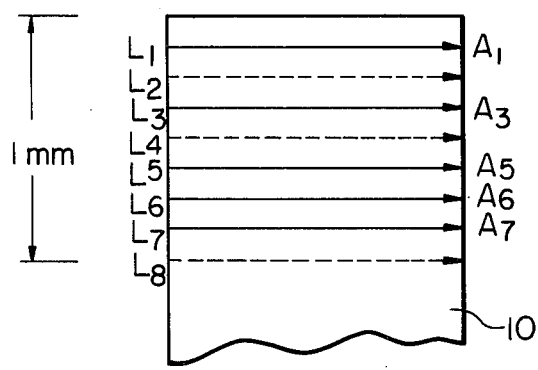
FIG. 1B is an explanatory view of a pattern of scanning lines in accordance with the variable feed scanning method.

The above-mentioned abridgement of the facsimile data signal will be explained with reference to FIGS. 1A and 1B. FIG. 1A is an explanatory view of a pattern of typical scanning lines. FIG. 1B is an explanatory view of a pattern of scanning lines obtained in accordance with the above-mentioned variable feed scanning method. In FIG. 1A, 10 indicates a document to be scanned. The arrows, $L_1$ through $L_8$ schematically indicate scanning lines scanned on the document 10 by a scanner (not shown) with a scanning line density of 8 lines/mm. As shown in FIG. 1A, in typical scanning, there is no abridgement of scanning lines. The symbols $A_1$ through $A_8$ stand for facsimile information contained respectively in the scanning lines $L_1$ through $L_8$.

On the other hand, according to the above-mentioned variable feed scanning method, the scanning lines $L_2$, $L_4$ and $L_8$ are abridged as shown by dotted arrows in FIG. 1B. FIG. 1B shows one example of a pattern of scanning lines, when density of each of the facsimile informations $A_1$, $A_3$ and $A_7$, contained respectively in scanning lines $L_1$, $L_3$ and $L_8$, is low. In accordance with the variable feed scanning method, when the density of the facsimile information $A_1$ in scanning line $L_1$ is low, the facsimile information $A_2$ (see FIG. 1A) in scanning line $L_2$ is represented by the information $A_1$, and, therefore, the scanning line $L_2$ can be abridged. Similarly, when the density of each of the facsimile informations $A_3$ and $A_7$ is low, the facsimile informations $A_4$ and $A_8$ (see FIG. 1A) are represented by the informations $A_3$ and $A_7$ respectively and, therefore, the scanning lines $L_4$ and $L_8$ can be abridged. Whether each of the scanning lines contains a low density of facsimile information or not is automatically determined by a discriminator. The discriminator counts the number of transitions from black to white and from white to black and, thereby, determines whether each scanning line has a low density of facsimile information or not.

Figure 2A:
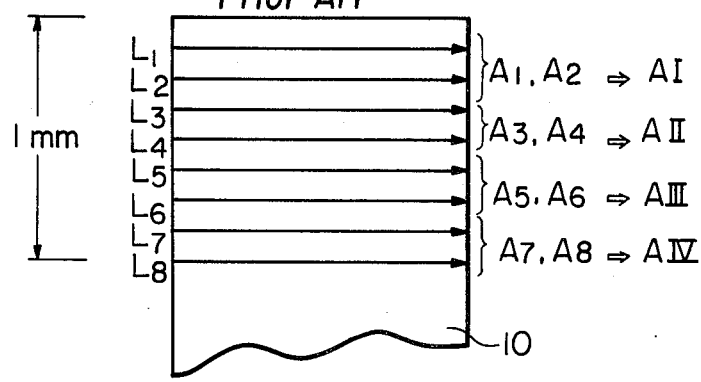
FIG. 2A is an explanatory view for of a pattern of scanning lines in accordance with the dual-line data compression method.
Figure 2B:
FIG. 2B is an explanatory view of the four basic modes of a two bit pattern used in the dual-line data compression method.

In recent years, another type of method for compressing a video signal has been proposed, called the dual-line data compression method. The dual-line data compression method will be explained with reference to FIGS. 2A and 2B. FIG. 2A is an explanatory view of a pattern of scanning lines obtained in accordance with the dual-line data compression method. In FIG. 2A, two adjacent successive scanning lines, for example, the scanning lines ($L_1$, $L_2$), ($L_3$, $L_4$), . . . , are combined. Thus, the facsimile informations $A_1$ and $A_2$ are formed into single information AI. Accordingly, two facsimile informations $A_1$ and $A_2$ are transmitted at the same time in the form of a single information AI. Similarly, two facsimile informations ($A_3$, $A_4$), ($A_5$, $A_6$), . . . , are transmitted at the same time in the forms of informations AII, AIII, . . . , respectively. FIG. 2B is an explanatory view of the basic modes of each of the above-mentioned informations AI, AII, AIII, . . . . The first mode $M_1$ is (white, white), the second mode $M_2$ is (white, black), the third mode $M_3$ is (black, white), and the fourth mode $M_4$ is (black, black), and these four modes are coded (0, 0), (0, 1), (1, 0) and (1, 1), respectively. The transmitter transmits the combination of these four codes in accordance with the facsimile information to the remote receiver. At this time, the transmitter also transmits a coded run-length signal of each mode in order to further compress the bandwidth of the video signal to be transmitted.

Figure 3:
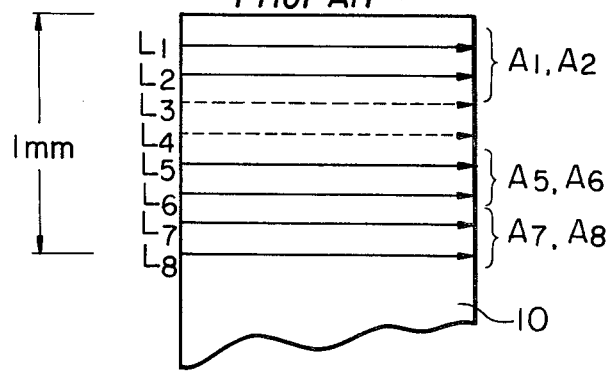
FIG. 3 is an explanatory view of one example of a pattern of scanning lines in accordance with a combined method of the variable feed scanning method and the dual-line data compression method.

The above-mentioned variable feed scanning method is useful for automatically compressing the bandwidth of a video signal, and the above-mentioned dual-line data compression method is also useful for automatically compressing the bandwidth of a video signal. In view of this, it may seam that a combined method of the variable feed scanning method and the dual-line data compression method would be more useful than either of the two methods alone. However, the combined method of the variable feed scanning method and the dual-line data compression method has the following disadvantages. One disadvantage is that (referring to FIG. 1A), when only the facsimile information $A_3$ in scanning line $L_3$ has to be abridged in accordance with the variable feed scanning method, the facsimile information $A_4$ in scanning line $L_4$ is also unnecessarily abridged due to the dual-line data compression method. FIG. 3 is an explanatory view for clarifying this disadvantage. In FIG. 3, the facsimile information $A_3$ is abridged by repeating the facsimile information $A_2$ in accordance with the variable feed scanning method, however, the facsimile information $A_4$ is also unnecessarily abridged due to the dual-line data compression method. Accordingly, the quality of facsimile of the original document reproduced in the remote receiver is considerably reduced.

The other disadvantage is that it is impossible to abridge three or more successive scanning lines. It should be noted that, when the scanner scans the area of the document in which the density of the facsimile information is extremely low, it is advantageous to abridge three or more successive scanning lines.

The method according to the present invention is basically the same as the above-mentioned combined method. However, the method according to the present invention has none of the above-mentioned disadvantages of such a combined method.

Figure 4A:
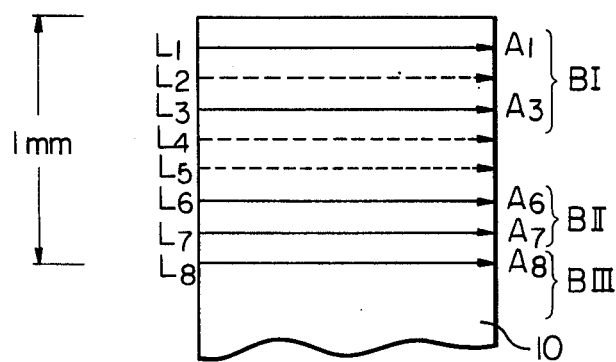
FIG. 4A is an explanatory view of one example of a pattern of scanning lines according to the present invention.

FIG. 4A is an explanatory view of one example of a pattern of scanning lines according to the present invention. As shown in FIG. 4A, the scanning lines $L_2$, $L_4$ and $L_5$ are abridged. These abridgements are determined in accordance with correlation information. The correlation information is provided by a discriminator which counts the number of transitions from black to white and from white to black in each scanning line. Next, dual-line facsimile informations are produced by the pairs of facsimile informations ($A_1$, $A_3$), ($A_6$, $A_7$), . . . The pair of facsimile informations ($A_1$, $A_3$) are transformed into a single dual-line facsimile information BI. Similarly, the pair of facsimile informations ($A_6$, $A_7$) are transformed into single dual-line facsimile information BII. The information BIII is formed by the pair of the informations $A_8$ and the next information. Each of the dual-line facsimile informations BI, BII, BIII, . . . , contains a coded signal of four basic modes (see FIG. 2B) and, also, a run-length signal of each mode. In this case, for the purpose of further compression of the bandwidth, one of the four basic modes which may occur very frequently should have a short bit size coded signal. In addition, one of the informations indicating transitions from black to white and vice versa which may occur very frequently should have a short bit size coded signal.

Figure 4B:
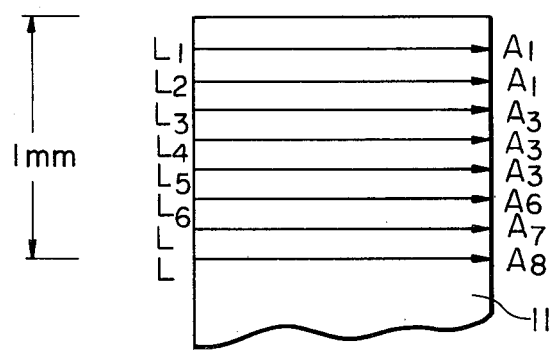
FIG. 4B is an explanatory view of one example of a pattern of scanning lines scanned in a remote receiver, according to the present invention.

In the remote receiver, when the dual-line facsimile information, for example, BI (FIG. 4A), is received, the information BI is demodulated into the pair of facsimile informations $A_1$ and $A_3$ (FIG. 4A), and the correlation information is analyzed. Since this correlation information is the same as the correlation information which has been detected in the transmitter, the remote receiver can detect which scanning line or scanning lines have been abridged in the transmitter. In this example, the remote receiver can detect that the scanning line $L_2$ has been abridged. Then, as shown in FIG. 4B, the remote receiver supplies the received facsimile informations $A_1$ and $A_3$ to the scanning lines $L_1$ and $L_3$, respectively, and a repeat of the facsimile information $A_1$ is supplied to the abridged scanning line $L_2$. (In FIG. 4B, reference numeral 11 indicates a recording medium.) Similarly, a repeat of the facsimile information $A_3$ is successively supplied to the abridged scanning lines $L_4$ and $L_5$.

Figure 5:
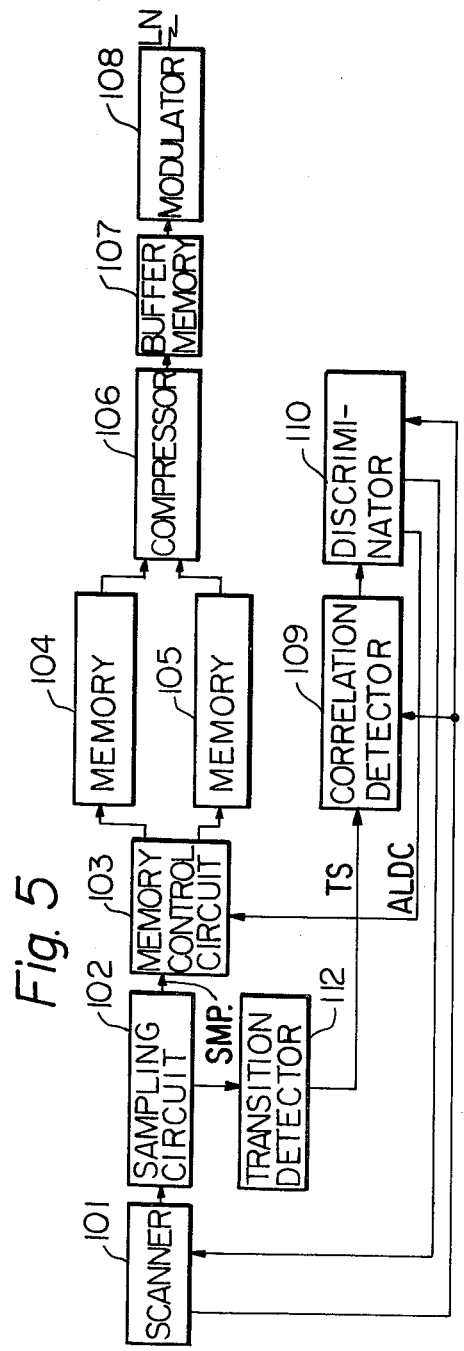
FIG. 5 is a block diagram of a transmitter according to the present invention.
Figure 6:
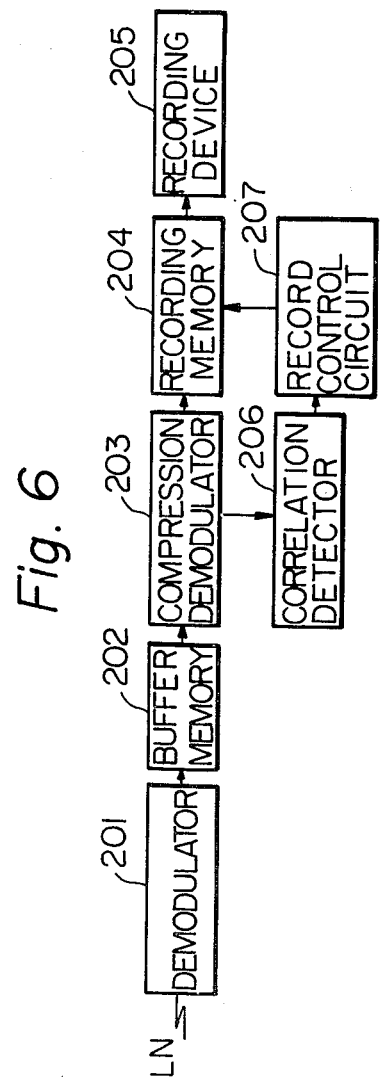
FIG. 6 is a block diagram of a remote receiver according to the present invention.

FIG. 5 is a block diagram of a transmitter according to the present invention. FIG. 6 is a block diagram of a remote receiver according to the present invention. Referring to FIG. 5, a scanner 101 scans an original document (not shown) to be transmitted along the scanning lines. The scanner 101 produces an electrical analog signal by way of a photo-electric converter in accordance with the facsimile information contained in each scanning line on the document. The scanner 101 also adds a synchronizing pulse to the electric analog signal each time a scanning line is scanned. In the sampling circuit 102, said electric analog signal is converted into a digital signal and is sampled in synchronism with sampling pulses. The sampled digital pulses have bit patterns consisting of bit signals "1" and "0", which represent, for example, the facsimile informations black and white, respectively. The sampled digital pulses are applied to a memory unit 104, by way of a memory control circuit 103, and stored therein. The sampled digital pulses from the sampling circuit 102 are also applied to a correlation detector 109 by way of a transition detecting circuit 112. Correlation information from the correlation detector 109 is applied to a scanning line density discriminator 110. The correlation detector 109 counts the number of transitions from black to white and vice versa. Each transition is detected by the transition detecting circuit 112, and the circuit 112 provides a transition signal (TS) regarding each scanning line to the correlation detector 109. The circuit 112 is comprised of a differentiating circuit. The detector 109 also determines whether said counted number of transitions, that is the correlation information, is lower than a predetermined number 32 or higher than a predetermined number 128 or between the predetermined numbers 32 and 128. When the scanner 101 scans the scanning line $L_3$ (see FIG. 4A) and the discriminator determines that said counted number of transitions is, for example, lower than the predetermined number 32, it is anticipated that each pattern density in the scanning lines $L_4$ and $L_5$ will be low. As a result, the discriminator 110 controls the scanner 101 to abridge the scanning lines $L_4$ and $L_5$ (see FIG. 4A) and to scan the scanning line $L_6$ (See FIG. 4A). When the scanner 101 scans the scanning line $L_6$ (see FIG. 4A) and the discriminator determines that said counted number of transitions is, for example, higher than the predetermined number 128, then the discriminator 110 controls the scanner 101 so that is does not abridge the next scanning line $L_7$ (see FIG. 4A) and, accordingly, the scanning line $L_7$ is scanned. The discriminator 110 also controls the memory control circuit 103 and distributes each facsimile information to the memory unit 104 or the memory unit 105.

In the example mentioned above, when the scanner 101 scans the scanning line $L_3$ (see FIG. 4A), then the facsimile information $A_3$ of the line $L_3$, in the form of sampled digital pulses, is stored in the memory unit 105 by the control of the memory control unit 103. It should be noted that the facsimile information $A_1$ of the line $L_1$ has already been stored in the memory unit 104, and the facsimile information $A_2$ of the line $L_2$ was abridged because the information $A_1$ has low pattern density. The sampled digital pulses stored in both the memory units 104 and 105 are compressed in a compressor 106 and applied to a buffer memory circuit 107.

In the example mentioned above, the scanner 101 abridges the scanning lines $L_4$ and $L_5$ (see FIG. 4A) and scans the scanning line $L_6$. Then, the facsimile information $A_6$ of the line $L_6$ is stored in the memory unit 104 by the control of the memory control circuit 103. Further, in the example mentioned above, the facsimile information $A_7$ of the line $L_7$ is stored in the memory unit 105 by the control of said circuit 103. When facsimile information is stored in both the memory units 104 and 105, they are compressed in said compressor 106. The compressed facsimile information is temporarily stored in said buffer memory circuit 107 and, then, transmitted to the remote receiver (see FIG. 6) through a conventional modulator 108 and a transmission line LN. The compressor 106 is also used in the dual-line data compression method.

Referring to FIG. 6, the compressed facsimile informations provided from the transmission line LN is applied to a buffer memory circuit 202 through a conventional demodulator 201. Each of the compressed facsimile informations from the circuit 202 is demodulated by a compression-demodulator 203 and, thereby, the original facsimile information is reproduced. This original facsimile information is the same as the facsimile information stored in the memory units 104 and 105 (see FIG. 5), respectively. The original facsimile information is applied to a recording memory circuit 204 and also to a correlation detector 206. A signal from the detector 206 is applied to a record control circuit 207 which controls the recording memory circuit 204. The original facsimile information from the memory circuit 204 is applied successively to a recording device 205, which reproduces a copy of the document to be transmitted from the transmitter (FIG. 5). The correlation detector 206 has the same function as the correlation detector 109 in the transmitter (FIG. 5). Accordingly, when facsimile information $A_3$ in line $L_3$ (see FIG. 4A) is applied to the correlation detector 206 from the compression-demodulator 203, the correlation detector 206 can also detect that the scanning lines $L_4$ and $L_5$ (see FIG. 4A) were abridged in the transmitter in accordance with the correlation information. Then, the record control circuit 207 causes the recording memory circuit 204 to supply repeated facsimile information $A_3$ to the recording device 205 when the device 205 scans the scanning line corresponding to the scanning line $L_4$ on the recording medium 11 (see FIG. 4B). The repeated facsimile information $A_3$ is also supplied to the recording device when the device 205 scans the scanning line corresponding to the scanning line $L_5$ (see FIG. 4B). Similarly, the record control circuit 207 makes the circuit 204 supply the facsimile information $A_6$ (see FIG. 4B) when the recording device 205 scans the line corresponding to the scanning line $L_6$ (see FIG. 4B).

Figure 7:
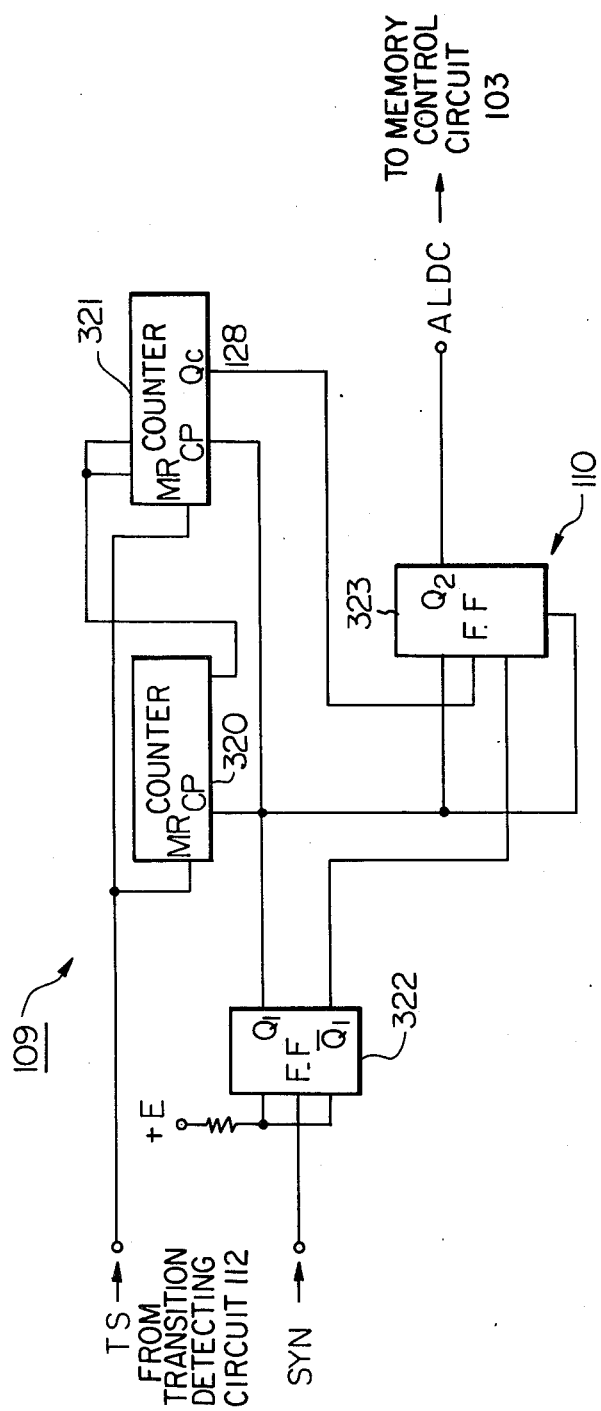
FIG. 7 is a block diagram showing the details of the circuit construction of both a correlation detector (109) and a scanning lines density discriminator (110) shown in FIG. 5.

FIG. 7 is a block diagram showing the details of the circuit constitution of both the correlation detector 109 and the scanning line density discriminator 110, both shown in FIG. 5. Hereinafter, in order to facilitate easy understanding by simplifying the explanation of the operation, a specified case is referred to. In this specified case, the correlation detector 109 detects only two conditions. That is, the correlation detector 109 detects whether the previously mentioned correlation information is higher than the previously mentioned number 128 or not. If the correlation information is higher than the number 128, the transmitter has to transmit the facsimile information with high scanning density, for example, 8 lines/mm. If the correlation information is lower than the number 128, the transmitter has to transmit the facsimile informations with low scanning density, for example, 4 lines/mm. The correlation detector 109 is comprised of a first counter 320, a second counter 321 and a flip-flop 322. The scanning line density discriminator 110 is comprised of a flip-flop 323. The signal from the output $Q_2$ of the flip-flop 323 is a so-called ALDC (Adaptive Line Density Control) signal, and the ALDC is applied to the memory control circuit 103 (FIG. 5). The flip-flop 323 of the discriminator 110 is operated by signals from the flip-flop 322, the counter 320 and the counter 321. The transition signals TS from the transition detecting circuit 112 (FIG. 5) are applied to the first counter 320 and the second counter 321. When the number of transition signals TS counted in the first counter 320 overflows the first counter 320, the second counter starts counting the signals TS. For example, the first counter 320 can count sixteen bits. When the number of signals TS exceeds the sixteen bits, then the second counter 321 starts counting the number of signals TS. Whether both the counters 320 and 321 should count the signal TS or not is commanded by the flip-flop 322. The flip-flop 322 changes its status ($Q_1=1$ or $Q_1=0$) every time the synchronizing pulse SYN is applied thereto. If the counter number of signals TS is higher than the aforesaid number 128, the output from $Q_2$ of the flip-flop 323 becomes a logic 1 signal due to the output from $Q_c$ of the counter 321. Accordingly, the ALDC becomes a 1 level signal, which indicates that the transmitter has to transmit the facsimile information with the density of 8 lines/mm. If the counted number of signals TS is lower than the aforesaid number 128, the output from $Q_2$ of the flip-flop 323 becomes a logic 0 signal due to the output from $Q_c$ of the counter 321. Accordingly, the ALDC becomes a logic 0 signal, which indicates that the transmitter has to transmit the facsimile information with the density of 4 lines/mm.

Figure 8:
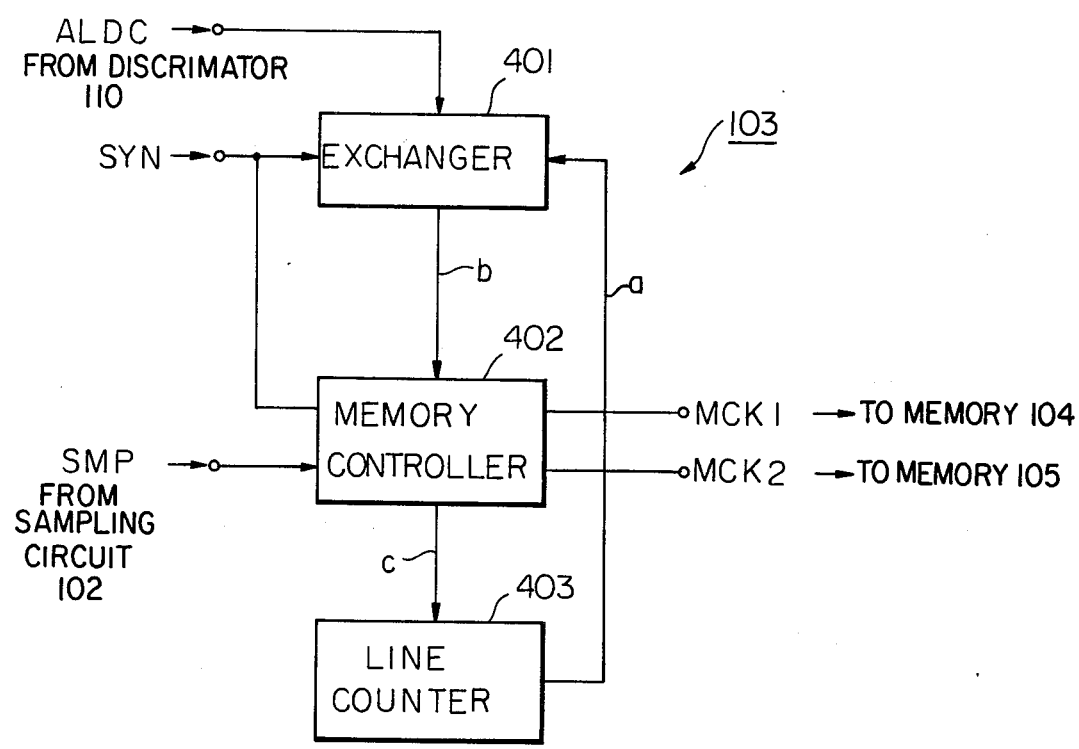
FIG. 8 is a schematic block diagram of a memory control circuit (103) shown in FIG. 5.

FIG. 8 is a schematic block diagram of the memory control circuit 103 shown in FIG. 5. In FIG. 8, the memory control circuit 103 is comprised of a scanning line density exchanger 401, a memory input/output controller 402 and a line counter 403. The synchronizing pulse SYN is applied to both the exchanger 401 and the controller 402. The ALDC signal is applied to the exchanger 401. Referring to both FIGS. 5 and 8, the sampling pulse SMP is applied to the controller 402 from the sampling circuit 102 (FIG. 5). The clock pulses MCK1 from the controller 402 are applied to the memory unit 104 (FIG. 5) and the clock pulses MCK2 from the controller 402 are applied to the memory unit 105 (FIG. 5). When the clock pulses MCK1 are applied to the memory unit 104, the memory unit 104 can store the facsimile information of one scanning line supplied from the sampling circuit 102. When the clock pulses MCK2 are applied to the memory unit 105, the memory unit 105 can store the facsimile information of another scanning line supplied from the sampling circuit 102. When a first facsimile information is supplied to the memory unit 104, the first facsimile information is also applied to the correlation detector 109 (FIG. 5) and the scanning line density discriminator 110 (FIG. 5). If the correlation information of the first facsimile information stored in the memory unit 104 is higher than the previously mentioned number 128, the discriminator 110 provides an ALDC signal which is a logic 1 signal indicating that the density should be 8 lines/mm. Then, the exchanger 401 provides a control signal to the controller 402 through line b when the line counter 403 finishes counting, for example, 2048 bits which corresponds to one scanning line. The 2048th bit is applied to the exchanger 401 through line a. Thereafter, the control signal causes the controller 402 to stop providing clock pulses MCK1 to the memory unit 104 and causes the controller 402 to start providing clock pulses MCK2 to the memory unit 105. The memory unit 105 stores a second facsimile information in synchronization with the clock pulses MCK2.

Contrary to the above, if the correlation information of said first facsimile information stored in the memory unit 104 is lower than the number 128, the discriminator 110 provides an ALDC signal which is a logic 0 signal indicating that the density should be 4 lines/mm. In this case, the exchanger 401 provides the control signal to the controller 402 through line b when the line counter 403 finishes counting twice said 2048 bits, that is 4096 bits. Thereafter, the control signal from the exchanger 401 causes the controller 402 to start providing clock pulses MCK2 to the memory unit 105. Therefore, the memory unit 105 stores a third facsimile information. In this case, the second facsimile information has been cancelled. Accordingly, the transmitter provides facsimile informations with a line density of 4 lines/mm. The counter 403 counts the sampling pulses SMP through the controller 402 and a line c. When the two facsimile informations are stored in the corresponding memory units 104 and 105, the MCK1 and MCK2 pulses are provided at the same time. Thereafter, these two facsimile informations are supplied to the compressor 106 (FIG. 5) at the same time.

Figure 9:
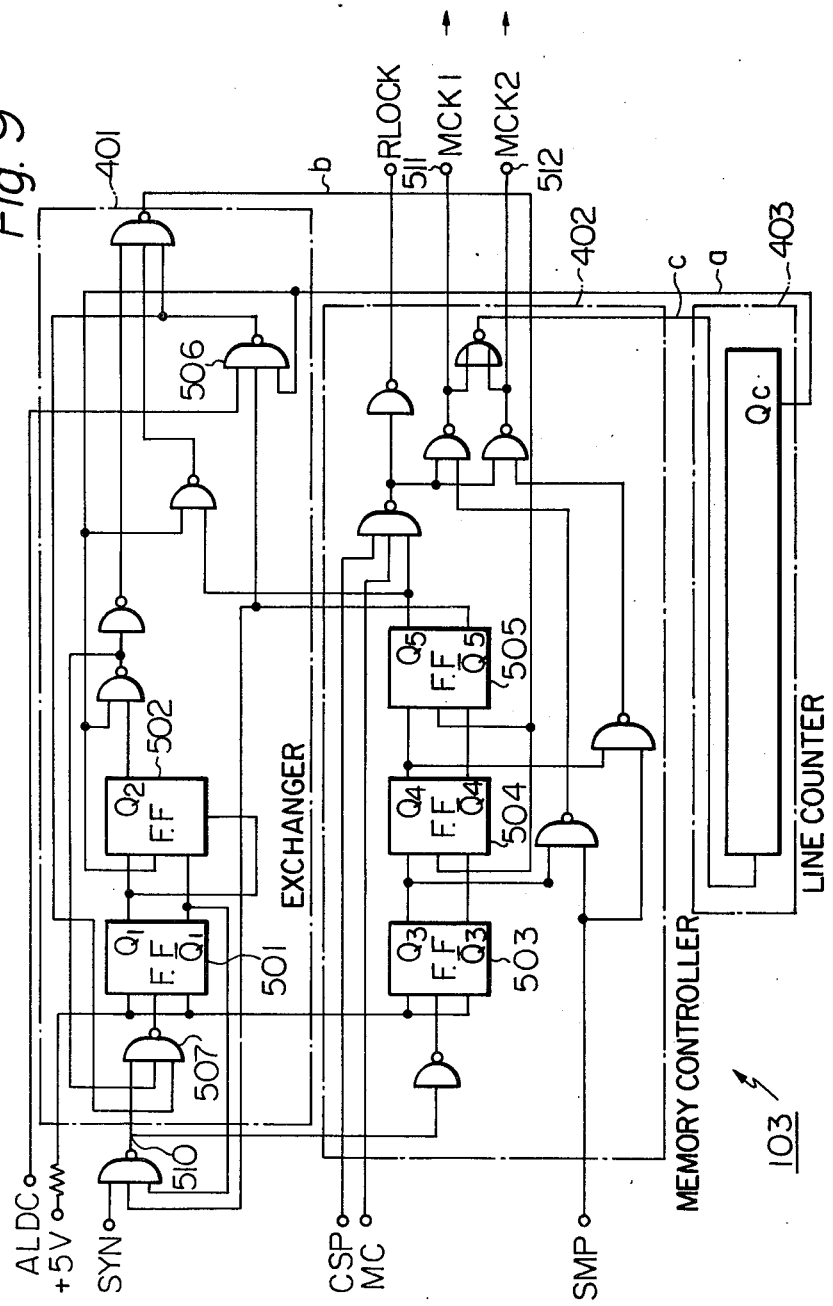
FIG. 9 is a detailed block diagram of the memory control circuit (103) shown in FIG. 8.

FIG. 9 is a detailed block diagram of the memory control circuit 103 shown in FIG. 8. In FIG. 9, the blocks indicated by broken lines 401, 402 and 403, respectively correspond to the scanning line density exchanger 401, the memory input/output controller 402 and the line counter 403 shown in FIG. 8. The symbols a, b and c, respectively correspond to the lines a, b and c shown in FIG. 8. The signals indicated by the symbols ALDC, SYN, MCK1, MCK2 and SMP have already been explained with reference to FIG. 8. The symbol CSP indicates a clock stop signal and the symbol MC indicates main clock pulses. The clock stop signal causes the cessation of supplying the clock pulse for a predetermined interval when the transition signal TS occurs in order to allow enough time to store the transition information in the corresponding memory contained in the compressor 106 (FIG. 5). The scanning lines density exchanger 401 is comprised of flip-flops 501 and 502 and gate circuits as shown. The memory input/output controller 402 is comprised of flip-flops 503, 504 and 505 and gate circuits as shown. When the synchronizing pulse SYN appears at a point 510, the signal from the output $Q_1$ of the flip-flop 501 becomes a logic 1 signal and the signal from the output $Q_3$ of the flip-flop 503 also becomes logic 1 signal. Therefore, clock pulses MCK1 are provided from a terminal 511. In synchronization with the clock pulses MCK1, the memory unit 104 (FIG. 5) stores a first facsimile information. At the same time, the correlation detector 109

(FIGS. 5 and 7) provides the correlation information and the scanning line density discriminator 110 provides an ALDC signal (FIG. 7). If the ALDC signal is a logic 1 signal, indicating that the scanning line density should be 8 lines/mm, the signal from the output $Q_1$ of the flip-flop 501 becomes a logic 0 signal when the line counter 403 finishes counting the 2048 bits of the sampling pulses SMP. When the line counter 403 finishes counting the 2048 bits of the sampling pulses SMP, the signal from the output $Q_c$ of the line counter 403 is applied to the flip-flop 501 through the line a and the gates 506 and 507. Thereafter the signal from the output $Q_1$ is converted from a logic 1 signal to a logic 0 signal. When the signal from $Q_c$ appears, the signal from the output $Q_4$ of the flip-flop 504 becomes a logic 1 signal. Accordingly, the clock pulses MCK2 are provided from a terminal 512. In synchronization with the clock pulses MCK2, the memory unit 105 (FIG. 5) stores a second facsimile information. When the memory units 104 and 105, respectively store the first and second informations, the signal from $Q_5$ of the flip-flop 505 becomes a logic 1 signal and both the first and second informations are supplied to the compressor 106.

When the synchronizing pulse SYN appears at the point 510, the signal from the output $Q_1$ of the flip-flop 501 becomes a logic 1 signal, and the signal from the output $Q_3$ of the flip-flop 503 also becomes a logic 1 signal. Therefore, clock pulses MCK1 are provided from a terminal 511. In synchronization with the clock pulses MCK1, the memory unit 104 (FIG. 5) stores a first facsimile information. At the same time, the correlation detector 109 (FIGS. 5 and 7) provides the correlation information and the scanning line density discriminator 110 provides an ALDC signal (FIG. 7). If the ALDC signal is a logic 0 signal, indicating that the scanning line density should be 4 lines/mm, the signal from the output $Q_1$ of the flip-flop 501 does not change to a logic 0 signal even when the line counter 403 finishes counting the 2048 bits of the sampling pulses SMP. Since the ALDC signal is a logic 0 signal, the signal from $Q_c$ of the line counter 403 cannot pass through the gate 506, however, the signal from $Q_c$ is supplied to the flip-flop 502 and, thereby, the signal from the output $Q_2$ of the flip-flop 502 becomes a logic 1 signal. Since the flip-flop 501 maintains a logic 1 signal at its $Q_1$ output, the flip-flop 504 maintains a logic 1 signal at its $Q_4$ output until the line counter 403 finishes counting twice the 2048 bits of the sampling pulses SMP. Therefore, the memory unit 105 cancels storage of the second facsimile information and stores a third facsimile information. When the line counter counts twice the 2048 bits, the flip-flop 505 provides a logic 1 signal at its $Q_5$ output, and both the first and third informations are supplied to the compressor 106 (FIG. 5).

Figure 10B:
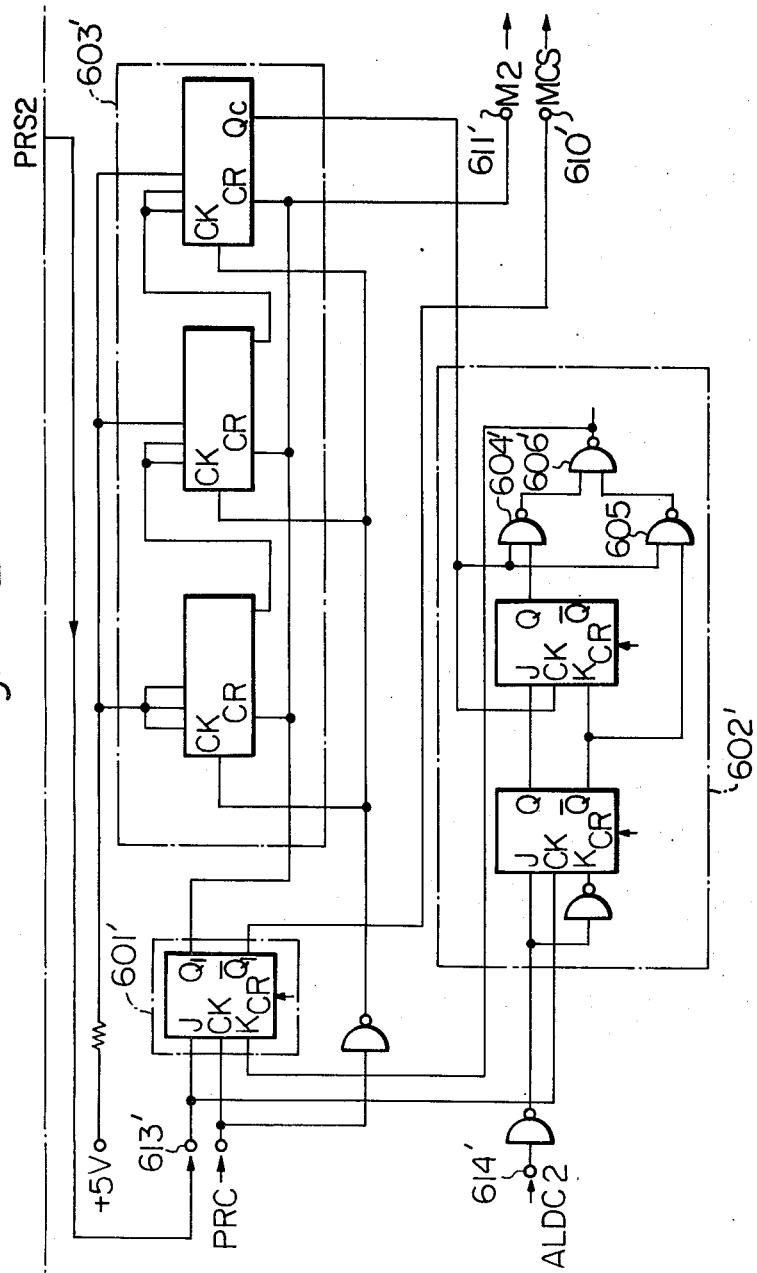

FIG. 10 is a detailed block diagram of the record control circuit 207 shown in FIG. 6. In FIG. 10, reference numeral 601 indicates a print start/stop control circuit comprises of a flip-flop, 602 indicates a scanning line density exchanger and 603 indicates a line counter. Referring to FIG. 10A and also to FIG. 10B, the signal ALDC1 is supplied from the correlation detector 206 (FIG. 6). The detailed construction of the correlation detector 206 is the same as that shown in FIG. 7. The memory control signals M1 and MCS are applied to the recording memory circuit 204 (FIG. 6). When the signal MCS is provided from a terminal 610, one of the two memory units (not shown) contained in the recording memory circuit 204 stores a first facsimile information which is demodulated by the compression-demodulator 203 (FIG. 6). At the same time, the other of said two memory units stores a second facsimile information (when the density is 8 lines/mm) or a third facsimile information (when the density is 4 lines/mm). When the signal M1 is provided from a terminal 611, one of said two memory units provides a first facsimile information to the recording device 205 (FIG. 6) as a video signal. When the signal $M_2$ is provided from a terminal 611', the other of said two memory units provides a second or a third facsimile information to the recording device.

The compressed facsimile information from the transmission line LN is demodulated by the compression-demodulator 203 (FIG. 6) into one facsimile information (1) which was stored in the memory unit 104 (FIG. 5) and the other facsimile information (2) which was stored in the memory unit 105 (FIG. 5). When the compression-demodulator 203 finishes demodulating said compressed facsimile information, the print start signal PRS1 is applied to a terminal 613 from the compression-demodulator 203. At the same time, the ALDC1 signal of said facsimile information (1) is applied to a terminal 614. The ALDC2 signal of sad facsimile information (2) is applied to a terminal 614'. The ALDC2 signal is produced by the other correlation detector (not shown) which has the same construction as shown in FIG. 7. This correlation detector is also contained in the correlation detector 206 (FIG. 6).

Figure 11:
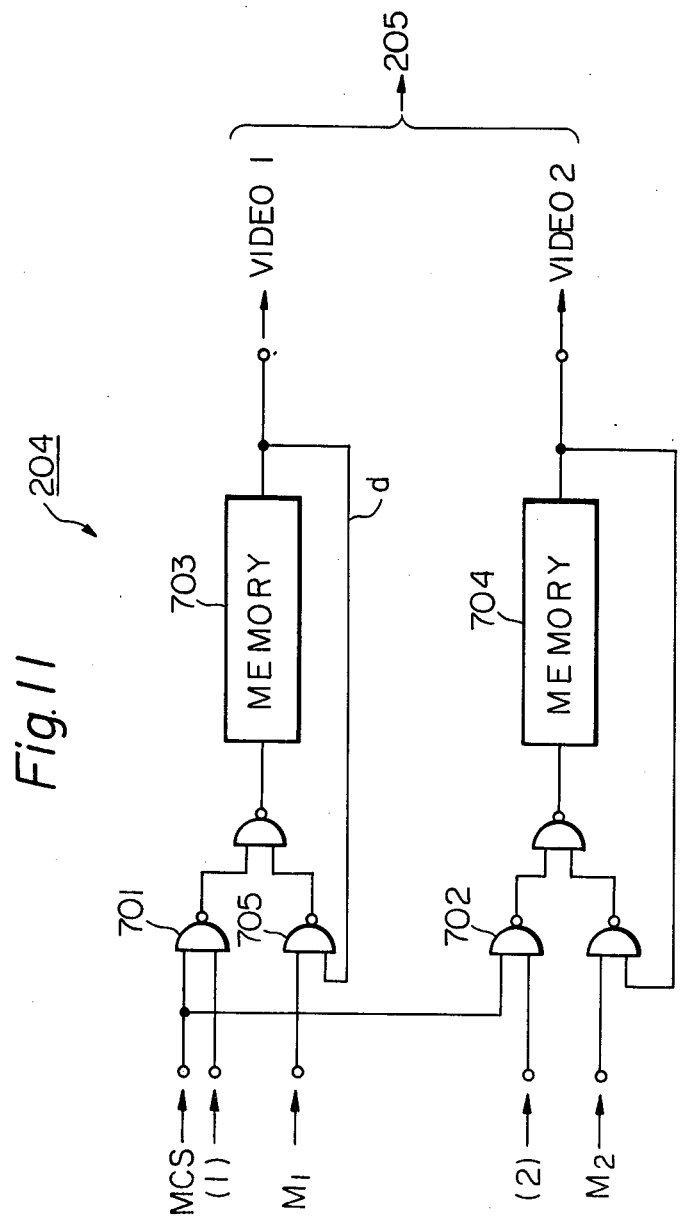
FIG. 11 is a detailed block diagram of a recording memory circuit (204) shown in FIG. 6.

During the time when the compression-demodulator 203 demodulates the compressed facsimile information, the signal MCS is applied to a gate 701 and also a gate 702, as shown in FIG. 11 which is a detailed block diagram of the recording memory circuit 204 shown in FIG. 6. Referring to FIGS. 10 and 11, the facsimile informations (1) and (2) are stored in the corresponding memory units 703 and 704 (FIG. 11). When the compression-demodulator 203 finishes demodulating the compressed facsimile information, the print start signal PRS1 is applied to the flip-flop 601 (FIG. 10A) and the signal M1 (FIG. 10A) is applied to the memory unit 703 (FIG. 11). Accordingly, the memory unit 703 provides a video signal to the recording device 205 (FIG. 6). When the signal PRS1 (FIG. 10) is applied to the terminal 613 (FIG. 10), the line counter 603 (FIG. 10) starts counting the print clock pulses PRC corresponding to said sampling pulses. When the line counter 603 finishes counting 2048 bits, corresponding to one scanning line, a signal is supplied from the output $Q_c$ of the counter 603. On the other hand, an ALDC1 signal (FIG. 10) of the facsimile information (1) is applied from the correlation detector 206 (FIG. 6) to a terminal 614. If the ALDC1 signal is a logic 1 signal, indicating that the density should be 8 lines/mm, the signal from the output $Q_c$ is applied to an input K of the flip-flop 601 through the gates 605 and 606. Then, the signal from the output $Q_1$ of the flip-flop 601 becomes a logic 0 level signal. Accordingly, the signal M1 is not applied to the gate 705 (FIG. 11) and the memory unit 703 provides no video signal to the recording device 205. Then, a print start signal PRS2 (FIG. 10) is applied to the flip-flop 601'.

Contrary to the above, if the ALDC1 signal is a logic 0 signal, indicating that the density should be 4 lines/mm, the signal from $Q_c$ of the line counter 603 is not applied to the input K of the flip-flop 601 through the gates 605 and 606. However, when the line counter 603 counts twice 2048 bits, the signal from $Q_c$ is applied to the input K of the flip-flop 601 through the gates 604 and 606. Accordingly, the signal M1 is being provided during the time the recording device 205 scans two successive scanning lines. The facsimile information (1) is supplied from the memory unit 703 (FIG. 11) to the recording device when it scans a first scanning line. The facsimile information (1) is restored in the memory unit 703 through the line d (FIG. 11). Thus, a repeat of first facsimile information (1) is supplied from the memory unit 703 (FIG. 11) to the recording device 205 when it scans a second scanning line.

When the line counter 603 counts twice 2048 bits, the print start signal PRS2 (FIG. 10) is supplied to the flip-flop 601'. Then, the same operation as described above will start with regard to the second facsimile information (2) by utilizing the memory unit 704.

It is to be understood that the invention is not to be limited to the above description, that various equivalent embodiments can be developed by one of ordinary skill, and that such are encompassed within the scope of the description and the appended claims.

What is claimed is:

1. A facsimile communication system for developing facsimile information contained in a document for transmission, for transmitting said facsimile information as a type of signal containing facsimile information for selected scanning lines and no facsimile information for unselected scanning lines, and for recovering facsimile information contained in said transmitted signal, said system comprising:
    scanning means for scanning the document in accordance with predetermined scanning lines to provide signals corresponding to the facsimile information for each scanning line;
    first determining means for determining, in transmission by discrimination, the pattern density of the facsimile information of each said scanning line;
    selecting means for selectively selecting or not selecting each scanning line in accordance with the corresponding pattern densities determined by said determining means;
    modulating means for modulating only the facsimile information contained in each said selected scanning line;
    demodulating means for demodulating said received signal to obtain said facsimile information contained in said received signal;
    second determining means for determining, in accordance with analyzing said demodulated facsimile information, a scanning line density for said received signal so as to detect said selected and unselected scanning lines; and
    controllable supplying means for controllably supplying said facsimile information for reproduction in accordance with said scanning line density determined by said determining means.

2. A facsimile communication system as set forth in claim 1 wherein, when a transmitted facsimile information contained in one scanning line has a low pattern density, the controllable supplying means controls the supply of the transmitted facsimile information for reproduction during scanning of a corresponding scanning line and, further, controls the repeated supply of this transmitted facsimile information for reproduction during scanning of at least one next scanning line adjacent to said corresponding scanning line, at least one scanning line being specified by said controllable supplying means in accordance with the scanning line density determined by the second determining means.

3. A facsimile communication system as set forth in claim 1, wherein the scanning means comprises a scanner which scans the document to develop analog signals representing the facsimile information in each corresponding scanning line, and a sampling circuit which receives and samples said analog signals from the scanner so as to represent each of the facsimile informations contained in each scanning line in the form of sampled digital pulses.

4. A facsimile communication system as set forth in claim 1, wherein said first determining means comprises a transition detector for differentiating each said corresponding signal from said scanning means to provide a transition signal representing the transitions in each corresponding scanning line, a counter means for counting the number of said transition signals in each corresponding scanning line, and means for selectively developing first and second scanning line density signals indicative of high pattern density and low pattern density, respectively, in accordance with the counted number being over and under, respectively, a predetermined count.

5. A facsimile communication system as set forth in claim 1, wherein said second determining means comprises:
    means for differentiating each said demodulated facsimile information to provide a transition signal representing the transitions in each corresponding scanning line,
    means for counting the number of said transition signals in each corresponding scanning line, and
    means for analyzing said counted number to determine whether said counted number is over a predetermined number to determine the scanning line density for said received signal.

6. A facsimile communication system as set forth in claim 1, wherein said second determining means selectively indicates low and high pattern densities of said scanning line, and wherein said controllable supplying means comprises:
    storing means for storing said demodulated facsimile information, and
    means for supplying at least one repetition of said demodulated facsimile information in said storing means for reproduction in accordance with said low pattern density of scanning line density determined by said second determining means and for supplying no repetition of said facsimile information in said storing means for reproduction in accordance with said high pattern density of scanning line density determined by said second determining means.

7. A facsimile communication system as set forth in claim 1, wherein the modulating means includes compressing means for compressing each pair of facsimile informations to develop corresponding compressed facsimile informations, said demodulating means demodulating each of the compressed facsimile informations.

8. A facsimile communication system as set forth in claim 7, wherein the compressing means includes means for combining one facsimile information contained in a first scanning line and other facsimile information contained in at least one subsequent scanning line when the one facsimile information has high pattern density relative to the density of the other facsimile information, compressing the combined facsimile information to form dual-line compressed facsimile information, and transmitting same to said receiver, and wherein the receiver demodulating means demodulates the dual-line compressed facsimile information into one original facsimile information and other original facsimile information, and the controllable supplying means controllably supplies said one original facsimile information, when this original facsimile information has high pattern density, for reproduction at the time of scanning a first scanning line, and the controllable supplying means controllably supplies the other original facsimile information for reproduction at the time of scanning a second scanning line, while the controllable supplying means controllably supplies the one original facsimile information, when this original information has low pattern density, for reproduction at the time of scanning a first scanning line and, next, the controllable supplying means controllably and repetitiously supplies the original facsimile information to said at least one subsequent scanning line.

9. A facsimile communication system as set forth in claim 7, including first and second memories for storing said facsimile information, correlation detector means for providing a scanning line density control signal selectively indicating low and high pattern densities of each said scanning line, and memory control means responsive to said scanning line density control signal for transferring the stored facsimile informations to said compressing means, wherein said transferring is performed in accordance with storing of the facsimile information of one scanning line in said first memory and that of the next scanning line in said second memory when said memory control means receives said scanning line density control signal indicative of said high pattern density of said one scanning line, and in accordance with the storing of the facsimile information of said one scanning line in said first memory and that of the next after the next scanning line in said second memory when said memory control means receives said scanning line density control signal indicative of said low pattern density of said one scanning line.

10. A facsimile communication system as set forth in claim 9, said scanning means comprising a scanner for scanning the document to develop analog signals representing the facsimile information in each scanning line, and a sampling circuit for receiving and sampling said analog signals from said scanner, to provide sampled digital pulses, wherein said memory control means comprises a scanning line density exchanger to which the scanning line density control signal and a synchronizing pulse are applied, a memory input/output controller to which the synchronizing pulse, the sampled digital pulses from the sampling circuit and a control signal from the scanning line density exchanger are applied, and a line counter to which the sampled digital pulses are applied through the memory input/output controller, wherein the line counter provides a predetermined bit count corresponding to one scanning line, the scanning line density exchanger receives N (N being a positive integer) times said predetermined bit count in accordance with the scanning line density control signal and controls the memory input/output controller to provide a first and a second memory control signal.

11. A facsimile communication method for recovering facsimile information contained in a received signal, said received signal being of a type containing facsimile information for selected scanning lines and no facsimile information for unselected scanning lines, said scanning lines being selected or not selected, prior to transmission, in accordance with respective pattern densities of said scanning line as determined by discrimination, the method comprising the steps of:
  (a) demodulating said received signal to obtain said facsimile information contained in said received signal;
  (b) determining a scanning line density for said received signal so as to detect, in accordance therewith, said selected and unselected scanning lines by analyzing said facsimile information; and
  (c) controllably supplying said facsimile informations for reproduction in accordance with said scanning line density determined in step (b).

12. A facsimile communication method as set forth in claim 11, wherein said step (c) comprises:
  supplying at least one repetition of each of said facsimile information, for which a determination that scanning lines have been abridged was made in step (b), as facsimile information for said abridged scanning lines.

13. A facsimile communication method as set forth in claim 11, wherein said step (b) comprises:
  differentiating each said facsimile information to provide a transition signal representing the transitions in each corresponding scanning line;
  counting the number of said transition signals in each corresponding scanning line; and
  analyzing whether said counted number is over a predetermined number to determine the scanning line density for said received signal.

14. A facsimile communication method as set forth in claim 11, wherein said received signal comprises a dual line compression signal, and said step (a) comprises dual line demodulating said received signal.

15. A facsimile communication system for recovering facsimile information contained in a received signal, said received signal being of a type containing facsimile information for selected scanning lines and no facsimile information for unselected scanning lines, said scanning lines being selected or not selected, prior to transmission, in accordance with respective pattern densities of said scanning lines as determined by discrimination, said system comprising:
  demodulating means for demodulating said received signal to obtain said facsimile information contained in said received signal;
  determining means for determining a scanning line density for said received signal so as to detect, in accordance therewith, said selected and unselected scanning lines by analyzing said facsimile information; and
  controllable supplying means for controllably supplying said facsimile informations for reproduction in accordance with said scanning line density determined by said determining means.

16. A facsimile communication system as set forth in claim 15, wherein said controllable supplying means comprises means for supplying, as facsimile information for each said unselected scanning line, at least one repetition of said facsimile information from corresponding selected scanning lines.

17. A facsimile communication system as set forth in claim 15, wherein said determining means comprises:
  means for differentiating said facsimile information of each scanning line to provide a transition signal representing the transitions in said each scanning line, means for counting the number of said transition signals in said each scanning line, and means for analyzing whether said counted number is over a predetermined number to determine said scanning line density for said received signal.

18. A facsimile communication system as set forth in claim 15, wherein said received signal includes a dual line compression facsimile signal, and said demodulating means comprises a dual line demodulator.

19. A facsimile communication system as set forth in claim 15, including a recording device, said determining means determining low and high scanning line densities in accordance with analyzing said facsimile information, and wherein said controllable supplying means comprises:

means for storing said facsimile information obtained by said demodulating means; and means for supplying at least one repetition of each of said facsimile information in said storing means to said recording device in accordance with said low pattern density of scanning line density determined by said determining means and supplying no repetition of each of said facsimile information in said storing means to said recording device in accordance with said high pattern density of scanning line density determined by said determining means.

20. A facsimile communication system for developing facsimile information contained in a document for transmission, said facsimile information including black-to-white and white-to-black transitions and having a pattern density, said system comprising:

scanning means for scanning the document in accordance with predetermined scanning lines to develop for each scanning line a corresponding signal representing the facsimile information in said each scanning line;

determining means for determining the pattern density of the facsimile information of each scanning line by counting the number of at least one of black-to-white and white-to-black transitions in said facsimile information of each scanning line and for developing a scanning line density control signal indicating one of high and low pattern densities in accordance with the determined pattern density;

first and second memory means for storing said facsimile information;

memory control means responsive to said scanning line density control signal for storing the facsimile information of one scanning line in said first memory and that of the next scanning line in said second memory when said memory control means receives said scanning line density control signal indicative of a high pattern density of one scanning line, and for storing the facsimile information of one scanning line in said first memory and that of the next after the next scanning line in said second memory when said memory control means receives said scanning line density control signal indicative of a low pattern density of one scanning line; and a dual line compressor for combining the facsimile information stored in the first and second memory means so as to produce a dual line compressed facsimile information.

21. A facsimile communication system as set forth in claim 20, wherein said determining means comprises a transition detector for differentiating each said corresponding signal from said scanning means to provide a transition signal representing at least one of the black-to-white and white-to-black transitions in said facsimile information of each scanning line, a counter means for counting the number of said transition signals corresponding to each scanning line, and means for developing first and second scanning line density signals indicative, respectively, of high pattern density or low pattern density in accordance with the counted number of said transition signals being over or under a predetermined count.

22. A facsimile communication system as set forth in claim 20, wherein said scanning means comprises a scanner circuit for developing an electrical analog signal corresponding to said each scanning line, and a sampling circuit for sampling said electrical analog signal to provide corresponding digital signals comprising said corresponding signal representing the facsimile information in said each scanning line.

23. A facsimile communication system as set forth in claim 22, wherein said memory control means comprises a scanning line density exchanger, said system comprising first means for applying said scanning line density control signal and a synchronizing pulse to said scanning line density exchanger, said memory control means further comprising a memory input/output controller, second means for applying the synchronizing pulse, the sampled digital pulse from the sampling circuit and a control signal from the scanning line density exchanger to said memory input/output controller, a line counter, third means for applying the sampled digital pulses through the memory input/output controller to said line counter, wherein the line counter provides a predetermined bit count corresponding to one scanning line, the scanning line density exchanger receives N times said predetermined bit count in accordance with the scanning line density control signal and controls the memory input/output controller to provide control signals for said first and second memories.

24. A facsimile communication system for compressing and transmitting facsimile informations contained, respectively, in corresponding scanning lines on a document to be transmitted, for receiving the facsimile informations transmitted, and for reproducing a copy of the document in a recording device, comprising:

a transmitter which includes first correlation detector means for determining by discrimination the pattern density of the facsimile information of each said scanning line, and for selecting a scanning line density in accordance with the determined pattern densities of the scanning lines containing said information to be transmitted, and means for transmitting the facsimile informations contained in said selected scanning lines in accordance with the scanning line density selected by the first correlation detector means; and a remote receiver which includes second correlation detector means for receiving the transmitted facsimile information, for determining by discrimination the pattern density of each of the transmitted facsimile informations, and for detecting another scanning line density in accordance with said determined pattern density of each of the transmitted facsimile informations, and means for controllably supplying said transmitted facsimile informations to the recording device in accordance with said another scanning line density determined by the second correlation detector means, whereby said recording device reproduces said copy of said document, wherein the transmitter includes means for combining one facsimile information contained in a first scanning line and other facsimile information contained in at least one subsequent scanning line when the one facsimile information has high pattern density relative to the density of the other facsimile information, and the transmitter compressing means compresses the combined facsimile information to form dual-line compressed facsimile information, and transmits same to said receiver, and wherein the receiver demodulating means demodulates the dual-line compressed facsimile information into one original facsimile information and other original facsimile information, and the remote receiver supplying means controllably supplies said one original facsimile information, when this original facsimile information has high pattern density, to the recording device at a time when the recording device scans a first scanning line, and the remote receiver supplying means controllably supplies the other original facsimile information to the recording device when it scans a second scanning line, while the remote receiver supplying means controllably supplies the one original facsimile information, when this original information has low pattern density, to the recording device at a time when the recording device scans a first scanning line and, next, the remote receiver supplying means controllably and repetitiously supplies the original facsimile information to said at least one subsequent scanning line, wherein the remote receiver comprises a compression-demodulator which demodulates the dual-line compressed facsimile information transmitted from the transmitter into original first and second facsimile informations, a recording memory circuit which has a first memory unit and a second memory unit storing the first and second facsimile informations, respectively, a correlation detector which determines by discrimination the pattern density of each of the first and second facsimile informations and which further provides a scanning line density control signal in accordance with the pattern density, which scanning line density control signal indicates at least two conditions of the pattern density, and a record control circuit which controls the input and output operations of each of the memory units in accordance with the scanning line density control signal applied from the correlation detector, wherein the record control circuit comprises print start/stop control circuits, scanning line density exchangers to which said scanning line density control signals of the first and second facsimile informations are applied, respectively, and line counters, the record control circuit being responsive to a print start signal applied to the print start/stop control circuit, which print start signal alternatively indicates that the compression-demodulator has finished demodulating the dual-line compressed facsimile information or is demodulating it, the record control circuit producing a first control signal by way of a first one of the line counters, a second control signal by way of a second one of the line counters, and a third control signal by way of the print start/stop control circuit, the memory units receiving the third control signal and being responsive thereto to store the first and second facsimile informations, respectively, the memory units receiving the first and second control signals and being responsive thereto to provide the stored first and second facsimile informations alternately to the recording device, the exchanger being responsive to the ALDC signal of the first facsimile information for determining a period for providing the first control signal, the exchanger being responsive to the ALDC signal of the second facsimile information for determining a period for providing the second control signal.

25. A facsimile communication system as set forth in claim 24, wherein the determined periods are defined by N cycles of the occurrence of a predetermined bit count of the line counters, where N is a positive integer and the predetermined bit count corresponds to one scanning line.

* * * * *